UNITED STATES PATENT OFFICE.

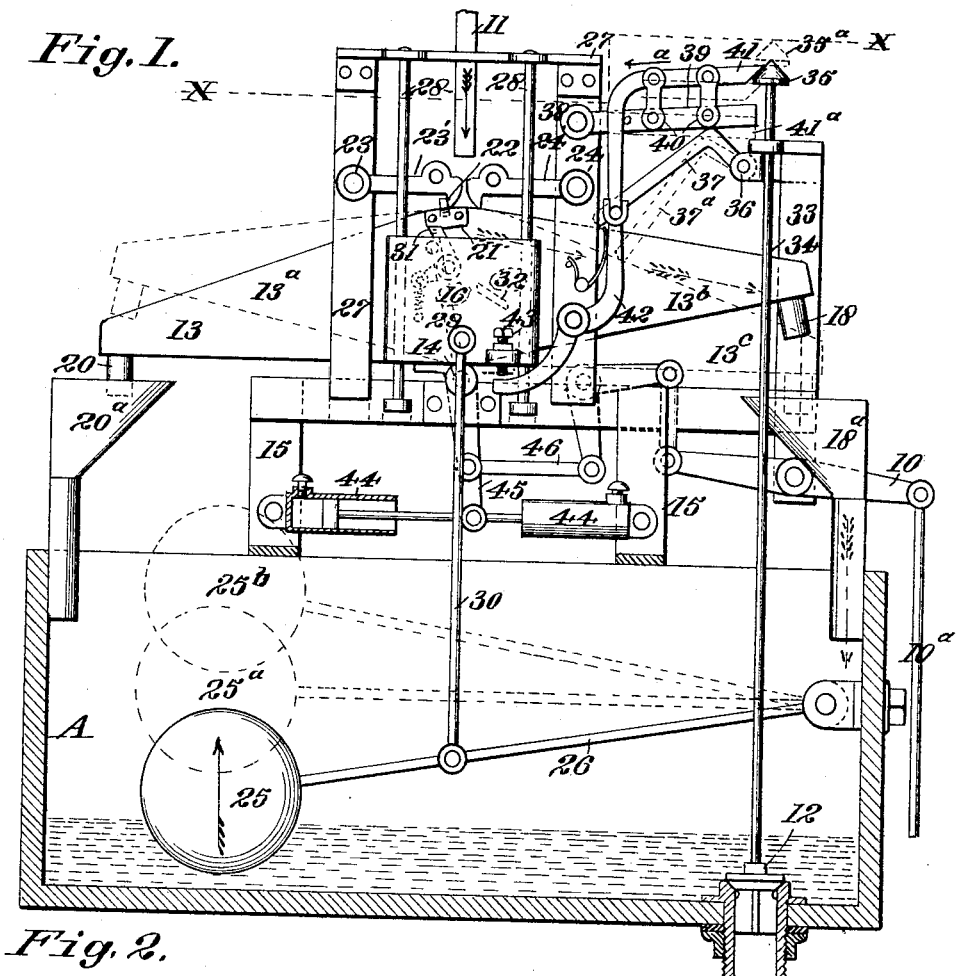

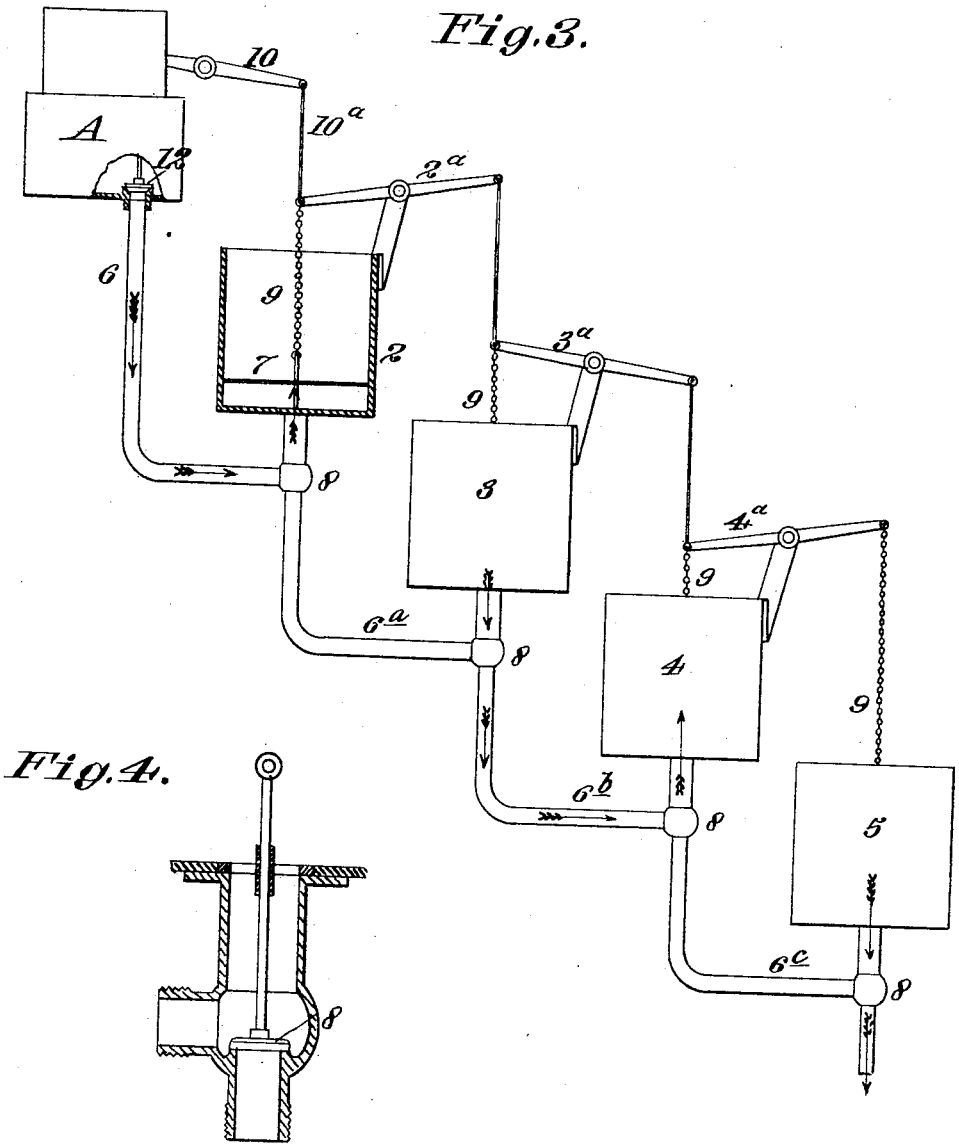

MYRON S. PELTON, OF FOLSOM, CALIFORNIA.

PHOTOGRAPH-WASHING MACHINE.

1,114,909.   Specification of Letters Patent.   Patented Oct. 27, 1914.

Application filed April 16, 1914.   Serial No. 832,197.

*To all whom it may concern:*

Be it known that I, MYRON S. PELTON, a citizen of the United States, residing at Folsom, in the county of Sacramento and State of California, have invented new and useful Improvements in Photograph-Washing Machines, of which the following is a specification.

This invention relates to a photograph washing machine in which the photographs to be washed are placed in a series of connected tanks through which water is passed intermittently.

One of the objects of the present invention is to provide a simple, substantial, cheaply manufactured washing machine of the character described, which is automatic in operation and economical, as far as the consumption of water is concerned.

Another object of the invention is to provide means for intermittently filling and emptying the washing tanks and to apply the water in such a manner as to produce the most thorough saturation and washing with the least or minimum amount of water.

Further objects will hereinafter appear.

The invention consists of the parts and the construction and combination of parts as hereinafter more fully described and claimed, having reference to the accompanying drawings, in which—

Figure 1 is a section of the supply tank, showing the controlling mechanism and the float operable in connection with same. Fig. 2 is a plan section on line $x$—$x$, Fig. 1. Fig. 3 is a diagrammatic view showing the position of the washing tanks with relation to the supply tank. Fig. 4 is a detail view of the form of valve used in connection with each washing tank.

Referring to the drawings, A indicates a supply tank, and 2, 3, 4 and 5 a series of washing tanks which are connected with each other and the main supply tank by a pipe 6. The washing tanks are in this instance provided with interior, slightly elevated, perforated false bottoms or screens 7, upon which the photographs to be washed are placed. The lower connection of each tank is provided with a suitable form of valve 8, an enlarged view of which is indicated in Fig. 4. Each valve is connected by a chain 9 with an arm, and each arm, that is $2^a$, $3^a$ and $4^a$, is in turn connected with the adjacent arm by a link, such as indicated at $10^a$, and these are in turn controlled by a main rocker-arm 10 actuated by a controlling mechanism hereinafter to be described. Water is delivered to the main supply tank through a pipe 11, and the flow of water from the supply tank through pipe 6, which connects with tank 2, is controlled by a valve 12 which in turn is opened or closed by the controlling mechanism previously mentioned.

The controlling mechanism proper consists of a tank 13, which is pivotally mounted, as at 14, in a frame 15 secured to tank A. The tank is centrally divided, as at 16, to form two chambers $13^a$ and $13^b$. The chamber $13^b$ is provided with an inlet opening 17 and a discharge opening 18 and the chamber $13^a$ is similarly provided with an inlet opening 19 and a discharge opening 20. Suitably secured to one side of the tank, as at 21, is a lug 22, and pivotally secured, as at 23 and 24, is a pair of latches $23'$ and $24'$, either of which may engage with lug 22 to secure the tank in one tilted position or the other. By referring to Fig. 1 it will be seen that lug 22 is engaged by latch $23'$. This secures the tank in a position where the water in chamber $13^a$ is permitted to discharge through spout 20 and a funnel $20^a$ into the supply tank, while opening 17 in chamber $13^b$ is brought into register with the supply pipe 11, permitting the water to enter on this side to fill the chamber. The water thus entering and filling the chamber $13^b$ will, however, overflow through spout 18 and will consequently enter the supply tank through funnel $18^a$. A gradual rise of water within the supply tank will cause the float 25 to rise, which float is secured upon the end of a pivotally mounted rod 26. The float is in this instance provided for the purpose of releasing one or the other of latches $23'$ or $24'$ to permit the tank to be tilted from one position to the other. This is accomplished through the following means: 27 indicates a secondary frame in which the latches $23'$ and $24'$ are mounted. Slidably mounted on a pair of vertically disposed rods 28 is a cross-head 29 which is connected with the float 25 and rod 26 by a link 30. The rise of the float within the tank will be transmitted through link 30 and raise the cross-head in an upward direction in frame 27. Suitably secured upon the inner face of the cross-head is a spring-actuated pawl 31 and a cam or lug 32. The upward movement of the cross-head will first bring pawl 31 into engagement with latch 23′ and lift this a sufficient distance to free lug 22. The releasing of the latch 23′, with relation to said lug, permits tank 13, which is now overbalanced by the filling of chamber 13ᵇ, to tilt over into the dotted line position, indicated at 13ᶜ. This permits all the water in chamber 13ᵇ to discharge through the spout 18 and funnel 18ᵃ into the supply tank and also brings the inlet opening of chamber 13ᵃ into register with its supply pipe 11, permitting this side of the tank to fill. The tilting of the tank from one side to the other will, however, bring lug 22 into engagement with the latch 24′ and it is held in this position until the water level within the supply tank has arisen sufficiently to bring lug 32 into engagement with latch 24′. Latch 24′ is thus lifted out of engagement with lug 22 and the tank, which is now overbalanced through the filling of chamber 13ᵃ, is again permitted to return to the full line position indicated in Fig. 1. Discharge valve 12 is lifted at this point to permit the water within the supply tank to discharge through pipe 6. This is accomplished through the following mechanism: 33 indicates a standard and slidably mounted in same is a rod 34. Suitably secured to the lower end of said rod is the valve 12 and secured to the upper end of said rod is a head 35. Pivotally mounted in the standard 33, as at 36, is an angle arm 37, the lower end of which engages with the top of the chamber 13ᵇ. The rocking of the tank from one side to the other will cause the angle lever to move from the full line position, indicated at 37, to the dotted line position indicated at 37ᵃ. Pivotally mounted in frame 27, as at 38, is an arm 39, the outer end of which is supported by the angle arm 37. Carried by arm 39, through a pair of parallel pivoted links 40, is a second angle arm 41. Engageable with the lower end of said arm is a forked rocker-arm 42, the lower end of which is so positioned as to become actuated by the cross-head when this is dropped into its lowermost position; a set screw 43 making it possible to adjust the amount of contact or distance that arm 42 is rocked.

For the purpose of cushioning the fall of tank 13, when this is tilted from one side to the other, a pair of dash-pots 44 have been provided with which a rigid arm 45, secured to tank 13, is connected. The arm is also utilized for the purpose of actuating the main rocker-arm 10 through the link connections indicated at 46.

The operation will now be as follows: Water entering through pipe 11 will first enter inlet opening of chamber 13ᵇ and will fill same. The water will, however, overflow through spout 18 and enter the supply tank through the funnel 18ᵃ. The chamber 13ᵇ continues overflowing until the float rises a sufficient distance to transmit its movement through link 30 and cross-head 29, or, in other words, until the cross-head 29 has been lifted a sufficient distance to release latch 23′. This immediately permits the overbalanced tank to rock over into the dotted line position indicated at 13ᶜ where it will be secured by the latch 24′; the fall of the tank being cushioned by the dash-pots 44 through arm 45. The water will now enter the inlet opening of chamber 13ᵃ and fill same and will also in this instance overflow through spout 20 and enter the supply tank through the funnel 20ᵃ. The gradual rise of water within the tank will cause the float to rise and the movement will be transmitted through the link 30 to raise the cross-head a sufficient distance to bring the lug 32 into engagement with latch 24′. The engagement of lugs 32 with the latch lifts this sufficiently high to bring it out of engagement with lug 22. The overbalanced tank will again rock back to the full line position indicated in Fig. 1, thus permitting chamber 13ᵇ to be brought into filling position. The tank 13 has now been filled twice and has performed one cycle of the operation. The discharge valve in tank A is opened at this point through the following means: The first rocking movement of the tank from the full line position to the dotted line position indicated at 13ᶜ causes the angle lever 37 to drop into the dotted line position indicated at 37ᵃ. This permits arm 39, with connected angle arm 41, to drop into the dotted line position indicated at 41ᵃ, bringing the end of arm 41 into position directly under the head 35 of the valve rod 34. The upward movement of the float from the dotted line position indicated at 25ᵃ to the position indicated at 25ᵇ takes place while the chamber 13ᵃ is being filled and while it is overflowing. The rise of the float from 25ᵃ to 25ᵇ was transmitted through rod 30 to the cross-head and lifted this sufficiently to bring lug 32 into engagement with latch 24′, causing this to release lug 22. The chamber 13ᵃ being filled will cause the tank to tilt back into the full line position shown, and the movement of same causes the angle arm to be lifted from the dotted line position indicated at 37ᵃ to the full line position indicated at 37. This movement is transmitted to lift arm 39, with connected angle arm 41. The outer end of the angle arm being in engagement with head 35 will lift this to the dotted line position indicated at 35ᵃ and this movement is transmitted through the rod to lift valve 12. The water within the supply tank is thus permitted to escape through valve 12 and pipe 6 to the first of the connected washing tanks 2, 3, 4 and 5. The discharge of water from the tank will now permit float 25, with connected cross-head 29, to drop into the lower position shown in Fig. 1. The engagement of the cross-head with arm 42 will rock this a sufficient distance to transmit movement through the forked upper end of same to angle arm 41, pulling it back in the direction of arrow $a$, or, in other words, out of engagement with the head 35. This permits the valve to drop into the closed position and will permit the float to rise and also allow the tank, with connected mechanism, to perform its cycle of operation.

From the foregoing description it can be seen that the tank 13 is rocked twice before the supply tank is filled, that the last rocking movement of the tank from the dotted line position, indicated at $13^c$, to the full line position is transmitted to open the valve, and that the lowering of the float, with connected cross-head, when reaching its lowermost limit, is transmitted through the arms 42 and 41 to release the valve and permit same to close. As an example, it may be stated that the tank is rocked from one position to the other every five minutes. This means that the complete filling of the tank takes place every ten minutes. The rocking movement of the tank takes place twice, however, during this time period and this movement is transmitted through arm 45, with connected link train 46, to the main rocker-arm 10. The main rocker-arm 10 is connected through the link $10^a$ with the connected rocker-arms $2^a$, $3^a$ and $4^a$ and causes these to be rocked every five minutes. The water discharging through valve 12 will first pass through pipe 6 and valve 8 into tank 2 and cause this to be filled. The next rocking movement of the tank will be transmitted through the main rocker-arm 10 and link $10^a$ to the arms $2^a$, $3^a$, and $4^a$, and the chains connecting same with the valves 8 will cause these to be lifted or closed, as the case may be. For instance, the valve in tank 2 will be open and the valve in tank 3 will be closed. The water is thus permitted to drain from tank 2 and fill tank 3. The next rocking movement of the main arm 10 will cause valve 8 in tank 2 to close, the valve in tank 3 to open, the valve in tank 4 to close, and the valve in tank 5 to open. The valve in the main tank A is opened at this time to permit the water in same to enter tank 2. The water which has previously drained from tank 2 into tank 3 will in this instance be permitted to escape into tank 4, the valve of which is closed, and the water which has previously been collected in tank 4 is similarly permitted to enter tank 5. It can thus be seen that the water discharged from the tank A is first passed through the pipe 6 to tank 2 where it remains until chamber $13^b$, in the rocking tank, is filled and released. The water in tank 2 is then released by valve 8 which is raised until the rocking tank tilts over to bring chamber $13^a$ into filling position. The water is then permitted to pass through pipe $6^a$ into tank 3. Tank 2 will thus be draining while chamber $13^a$ is filling and will remain empty until valve 12 is opened by the angle arm 41 which is rocked by the rocking tank when chamber $13^a$ is filled and released. Valve 8 in tank 2 will now be closed and will consequently be filled by the water discharging from the main supply tank. Valve 8 in the tank 3 will at the same time open and permit the water therein to pass through pipe $6^b$ into tank 4; valve 8 therein being closed simultaneously with valve 8 in tank 2. The tanks 3 and 5 are now draining while chamber $13^b$ and tanks 2 and 4 are filling. The water in tank 4 is similarly passed through pipe $6^c$ into tank 5 when chamber $13^b$ is filled and released, and the water in tank 2 is simultaneously passed into tank 3 while tanks 2 and 4 are draining and chamber $13^a$ is filling.

The main tank is flushed every ten minutes while the washing tanks are flushed every five minutes. Each washing tank will thus remain full of water five minutes and will similarly be permitted to stand empty or drain for five minutes. This effect is very efficient in connection with the washing of the photographs. The inrush of water through the inlet in the bottom of the tank will cause the water to flush up around the photographs, which are supported upon the false bottom, causing considerable agitation. The water remaining for five minutes will permit the photographs to become thoroughly saturated and the solution thereon to be absorbed and removed by the water. The draining of each tank for five minutes permits the photographs to become thoroughly drained again and the next influx of water will again stir up the photographs and saturate same. A batch of photographs placed in each tank is in actual practice subjected to about ten washings and will consequently become thoroughly washed by this treatment.

The controlling mechanism, consisting of the rocking tank, with connected float and valve-lifting mechanism, is simple in construction, automatic in operation and does not require any more space than similar apparatus heretofore constructed. The washing of the photographs is thoroughly accomplished and does not require any attention except to remove the photographs after they have been subjected to ten washings.

The materials and finish of the several parts of the apparatus are such as the experience and judgment of the manufacturer may dictate.

Having thus described my invention, what I claim and desire to secure by Letters Patent is—

1. A photograph washing machine, comprising in combination a supply tank, a plurality of washing tanks connected with said tank, a float in the supply tank, and a valve connected with said pipe and controlled by the float for intermittently supplying the washing tanks with water.

2. A photograph washing machine, comprising in combination a supply tank, a water supply pipe, a rocking tank interposed between the supply pipe and the supply tank, said tank being centrally divided, means for temporarily locking said tank to prevent it from rocking from one side to the other, a float in the supply tank, means controlled by said float for releasing the locking means on the rocking tank, a discharge valve in the tank, and means controlled by the rocking tank for opening and closing said discharge valve.

3. A photograph washing machine, comprising in combination a supply tank, a water supply pipe, a rocking tank interposed between the supply pipe and the supply tank, said tank being centrally divided, means for temporarily locking said tank to prevent it from rocking from one side to the other, a float in the supply tank, means controlled by said float for releasing the locking means on the rocking tank, a discharge valve in the tank, means controlled by the rocking tank for opening and closing said discharge valve, a plurality of connected washing tanks, and a pipe connecting one of said tanks with the valve in the supply tank.

4. A photograph washing machine, comprising in combination a supply tank, a water supply pipe, a rocking tank interposed between the supply pipe and the supply tank, said tank being centrally divided, means for temporarily locking said tank to prevent it from rocking from one side to the other, a float in the supply tank, means controlled by said float for releasing the locking means on the rocking tank, a discharge valve in the tank, means controlled by the rocking tank for opening and closing said discharge valve, a plurality of connected washing tanks, a pipe connecting one of said tanks with the valve in the supply tank, a valve in each washing tank, and means controlled by the rocking tank for intermittently closing and opening said valves.

5. A photograph washing machine, comprising in combination a supply tank, a water supply pipe, a rocking tank interposed between the supply pipe and the supply tank, said tank being centrally divided, a lug on said tank, a pair of latches engageable with said lug to hold the tank in one tilted position or the other, a float in the supply tank, means connected with said float for lifting first one and then the other of said latches to permit the rocking tank to rock from one side to the other, a discharge valve in the bottom of the supply tank, and means controlled by the rocking tank for opening and closing said valve.

6. A photograph washing machine, comprising in combination a supply tank, a water supply pipe, a rocking tank interposed between the supply pipe and the supply tank, said tank being centrally divided, a lug on said tank, a pair of latches engageable with said lug to hold the tank in one tilted position or the other, a float in the supply tank, means connected with said float for lifting first one and then the other of said latches to permit the rocking tank to rock from one side to the other, a discharge valve in the bottom of the supply tank, means controlled by the rocking tank for opening and closing said valve, a plurality of washing tanks, a pipe connected at one end with the discharge valve and at the other end with one of the washing tanks, and a pipe between each succeeding tank by which the water may be delivered from one tank to another.

7. A photograph washing machine, comprising in combination a supply tank, a water supply pipe, a rocking tank interposed between the supply pipe and the supply tank, said tank being centrally divided, a lug on said tank, a pair of latches engageable with said lug to hold the tank in one tilted position or the other, a float in the supply tank, means connected with said float for lifting first one and then the other of said latches to permit the rocking tank to rock from one side to the other, a discharge valve in the bottom of the supply tank, means controlled by the rocking tank for opening and closing said valve, a plurality of washing tanks, a pipe connected at one end with the discharge valve and at the other end with one of the washing tanks, a pipe between each succeeding tank by which the water may be delivered from one tank to another, a valve mounted in each pipe to control the inflow and outflow of water, and means for intermittently opening and closing said valves in alternate succession.

8. A photograph washing machine, comprising in combination a supply tank, a water supply pipe, a rocking tank interposed between the supply pipe and the supply tank, said tank being centrally divided, a lug on said tank, a pair of latches engageable with said lug to hold the tank in one tilted position or the other, a float in the supply tank, means connected with said float for lifting first one and then the other of said latches to permit the rocking tank to rock from one side to the other, a discharge valve in the bottom of the supply tank, means controlled by the rocking tank for opening and closing said valve, a plurality of washing tanks, a pipe connected at one end with the discharge valve and at the other end with one of the washing tanks, a pipe between each succeeding tank by which the water may be delivered from one tank to another, a valve mounted in each pipe to control the inflow and outflow of water, a plurality of connected rocker-arms controlled by the rocking tank, and means connecting the valve in each pipe with one of said rocker arms.

9. In a washing machine, the combination with a water supply pipe, of a supply tank, a discharge valve in the supply tank, means for intermittently opening and closing said valve, a plurality of washing tanks, a pipe connected at one end with the discharge valve and at the other end with one of the washing tanks, a pipe between each succeeding tank by which the water may be delivered from one tank to another, a valve mounted in each pipe to control the inflow and outflow of water through said tanks, and means for opening and closing said valves in alternate succession at timed intervals.

10. In a washing machine, the combination with a water supply pipe, of a supply tank, a discharge valve in the supply tank, a plurality of washing tanks, a pipe connected at one end with the discharge valve and at the other end with one of the washing tanks, a pipe between each succeeding tank by which the water may be delivered from one tank to another, a frame supported on the supply tank, a centrally divided rocking tank pivotally mounted in said frame, said rocking tank being interposed between the supply pipe and the supply tank, a lug secured to the rocking tank, a pair of latches pivotally mounted in the frame and engageable with the lug to hold the rocking tank in one tilted position or the other, a cross-head slidably mounted on the frame, a pair of lugs on said cross-head engageable with the latches to lift first one and then the other, a float in the supply tank connected with the cross-head to raise or lower same, and means controlled by the rocking tank for opening and closing the discharge valve.

11. In a washing machine, the combination with a water supply pipe, of a supply tank, a discharge valve in the supply tank, a plurality of washing tanks, a pipe connected at one end with the discharge valve and at the other end with one of the washing tanks, a pipe between each succeeding tank by which the water may be delivered from one tank to another, a frame supported on the supply tank, a centrally divided rocking tank pivotally mounted in said frame said rocking tank being interposed between the supply pipe and the supply tank, a lug secured to the rocking tank, a pair of latches pivotally mounted in the frame and engageable with the lug to hold the rocking tank in one tilted position or the other, a cross-head slidably mounted on the frame, a pair of lugs on said cross-head engageable with the latches to lift first one and then the other, a float in the supply tank connected with the cross-head to raise or lower same, means controlled by the rocking tank for opening and closing the discharge valve, a valve in each tank, and means controlled by the rocking tank for opening and closing said valves in alternate succession.

In testimony whereof I have hereunto set my hand in the presence of two subscribing witnesses.

MYRON S. PELTON.

Witnesses:
WILLIAM L. YOUNG,
FREDERICK P. BURNHAM.

---

Copies of this patent may be obtained for five cents each, by addressing the "Commissioner of Patents, Washington, D. C."